Dec. 26, 1950  H. B. WISHART  2,535,110
METHOD OF HEAT-TREATING WHEELS
Filed Feb. 28, 1946  6 Sheets-Sheet 1

INVENTOR.
Harold B. Wishart
BY Donald G. Dalton
ATTORNEY

Dec. 26, 1950          H. B. WISHART          2,535,110
METHOD OF HEAT-TREATING WHEELS
Filed Feb. 28, 1946          6 Sheets-Sheet 2
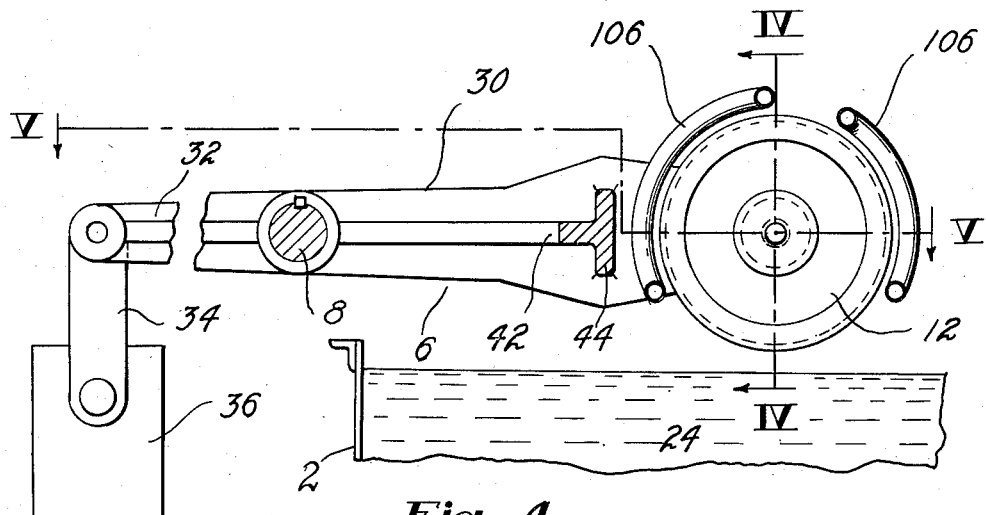
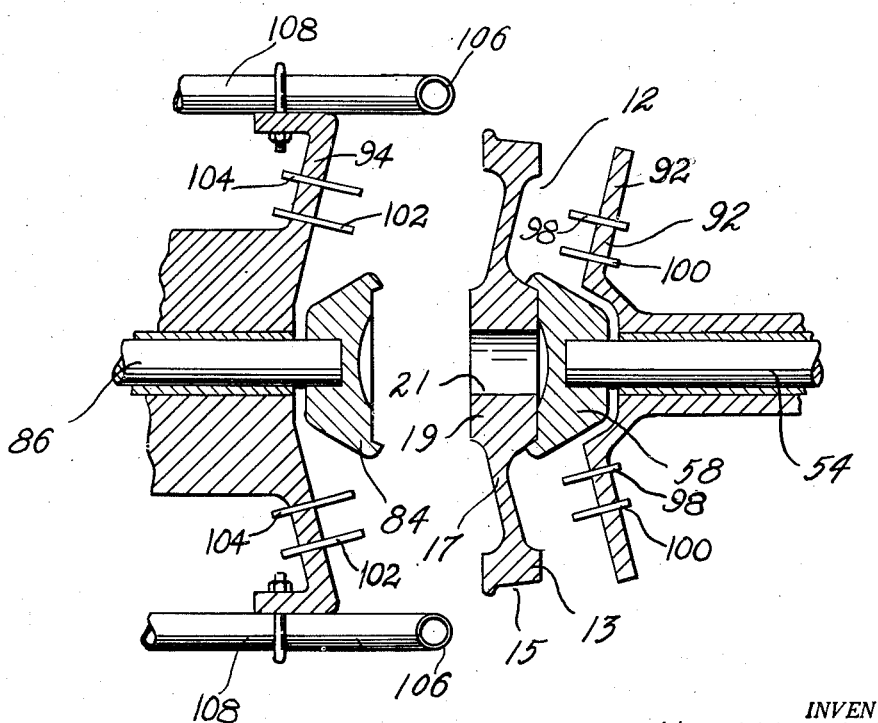
INVENTOR.
Harold B. Wishart
BY Donald G. Dalton
ATTORNEY Dec. 26, 1950   H. B. WISHART   2,535,110
METHOD OF HEAT-TREATING WHEELS Filed Feb. 28, 1946   6 Sheets-Sheet 3

INVENTOR.
Harold B. Wishart
BY Donald G. Dalton
ATTORNEY

Dec. 26, 1950     H. B. WISHART     2,535,110
METHOD OF HEAT-TREATING WHEELS
Filed Feb. 28, 1946     6 Sheets-Sheet 4

INVENTOR
Harold B. Wishart
BY Donald G. Walton
ATTORNEY

Dec. 26, 1950    H. B. WISHART    2,535,110
METHOD OF HEAT-TREATING WHEELS
Filed Feb. 28, 1946    6 Sheets-Sheet 5

INVENTOR.
Harold B. Wishart
BY Donald G. Dalton
ATTORNEY

Dec. 26, 1950     H. B. WISHART     2,535,110
METHOD OF HEAT-TREATING WHEELS
Filed Feb. 28, 1946     6 Sheets-Sheet 6

INVENTOR.
Harold B. Wishart
BY Donald G. Dalton
ATTORNEY

Patented Dec. 26, 1950

2,535,110

UNITED STATES PATENT OFFICE 2,535,110

METHOD OF HEAT-TREATING WHEELS

Harold B. Wishart, Gary, Ind., assignor to Carnegie-Illinois Steel Corporation, a corporation of New Jersey Application February 28, 1946, Serial No. 650,987

3 Claims. (Cl. 148—21.55)

This invention relates to a method of heat treating metal wheels, particularly steel railway wheels, to obtain desired properties in the various parts thereof.

The invention has among its objects the provision of an improved method of heat treating steel wheels, whereby the tread, the web plate, and the hub thereof are given substantially the optimum characteristics for each.

The apparatus disclosed herein is also disclosed and claimed in my copending application Serial No. 702,623, filed October 11, 1946, which is a division hereof.

Wheels for rolling stock, such as railway cars, particularly those used in modern high speed railway traffic, should, in order to be reasonably light while still providing an adequate safety factor, have the various parts thereof provided with quite different physical characteristics. This is necessary because of the different conditions encountered by the several parts in service and the necessary further fabrication of the wheel after heat treating. Thus, the tread which engages the rail and is subject to rapid heating upon the application of the brakes must be resistant to wear and to thermal shock. The portion of the hub of the wheel immediately surrounding the bore, which must be machined after heat treating of the wheel for the reception of the axle and of various bearing members, if such are used, should preferably remain machinable after the heat treating of the wheel. The web plate which connects the hub to the tread should be resilient and resistant to fatigue since it is subjected to flexing during use.

Since it is most feasible to form such wheels integrally and later to produce the different characteristics where desired in the various parts, it has been found necessary to employ heat treatments which leave such parts in conditions at least pointing toward the optimum conditions set out above. The wheel making industry has in general employed two methods of heat treating wheels for this purpose, the first of which comprises oil quenching the entire wheel from an austenitizing temperature, and the second of which comprises water quenching the rim and to some extent the hub from austenitizing temperature, known as the "rim toughening" process. In both such methods the wheels are given a time quench and are not quenched to room temperature. Neither of the above prior methods is entirely satisfactory because, while producing desirable qualities in one portion of the wheel they leave another portion, or the other portions, in far from the best condition. For instance, the oil quenching brings out the fatigue resistant quality of the metal which is desirable for the plate, but does not bring out the high thermal qualities necessary for the wheel tread. The water quench, on the other hand, brings out the best qualities for the tread, with no increase in the physical properties of the plate for fatigue resistance. In addition to the increase in physical values obtained by quenching, the residual stresses produced in the wheels by such treatment are of importance. The rim toughening process produces residual stresses which offer greater resistance to thermal cracking in the rim and greater resistance to plate failure as produced by brake application than the oil quenched wheels.

Because of the known disadvantages of such two prior methods, various compromise methods have been proposed. Among these is one employing differential quenching of the rim, plate, and major portion of the hub.

The method of the present invention allows the production of a wheel of the type described in which substantially the best physical characteristics are present in each part. Thus, such wheel has a tough wearing tread which is resistant to thermal shock, a web plate which is strong and resilient to meet the car and dynamic loads thereby minimizing fatigue failure, and a hub which is easily machinable. The invention consists broadly in dividing the wheel into quenching zones and providing independent quenching of the various zones, such quenchings being arranged in a sequence which will secure the best overall results. In addition, such dividing of the wheel into zones makes possible the use of various quenching techniques on the several zones, such quenchings being carried out in different sequences or combinations. As an example of one manner in which the invention may be carried out, the tread may be water spray quenched and then the entire wheel submerged in an oil bath to quench the plate.

The invention will be more readily understood by reference to the accompanying drawings, in which:

Figure 3 is a view in vertical section through the wheel gripping and manipulating device employed during the heat treating, the section being taken along the line III—III in Figure 5;

Figure 4 is a view in vertical section through the device, the section being taken along the line IV—IV in Figure 3;

Figure 6A:
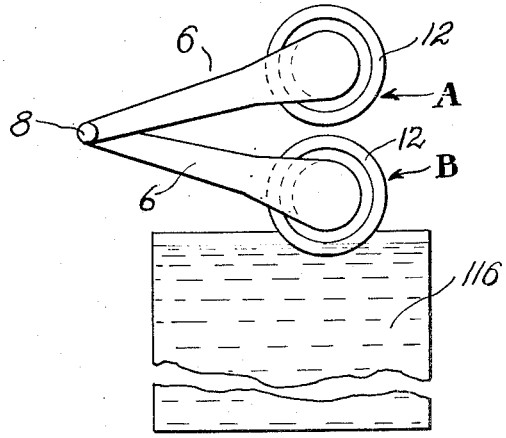
Figure 6B:
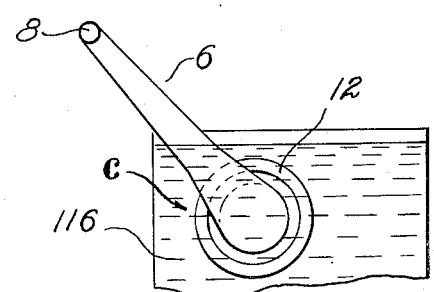
Figure 7:
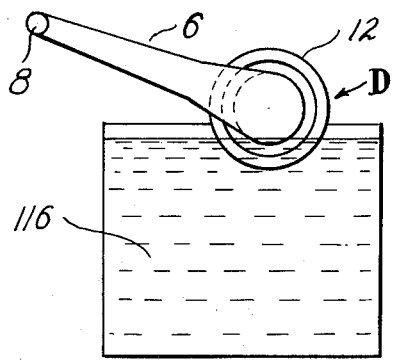
Figure 8:
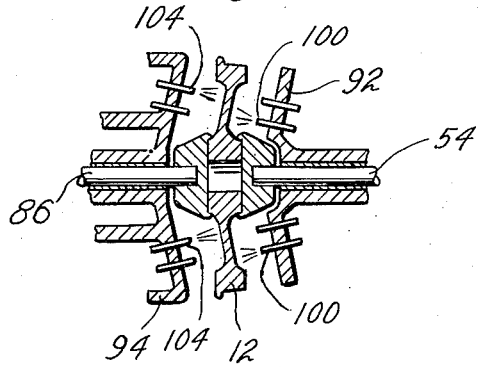
Figure 9:
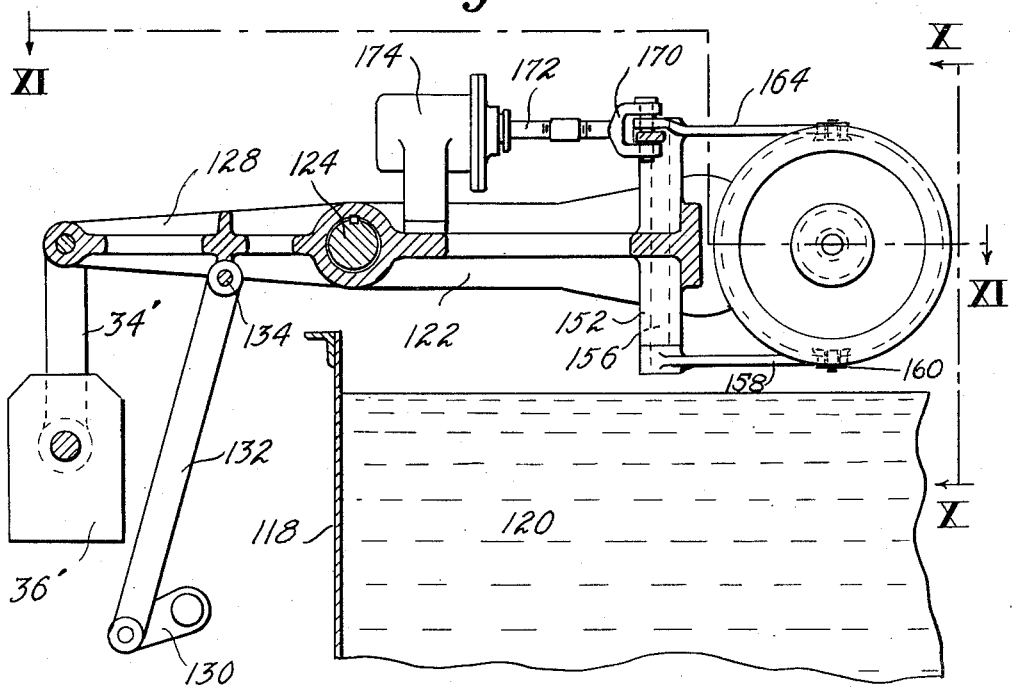
Figure 10:
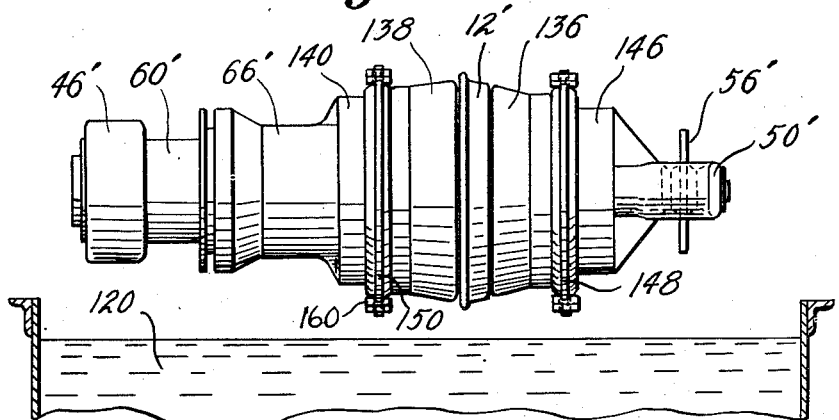
Figure 11:
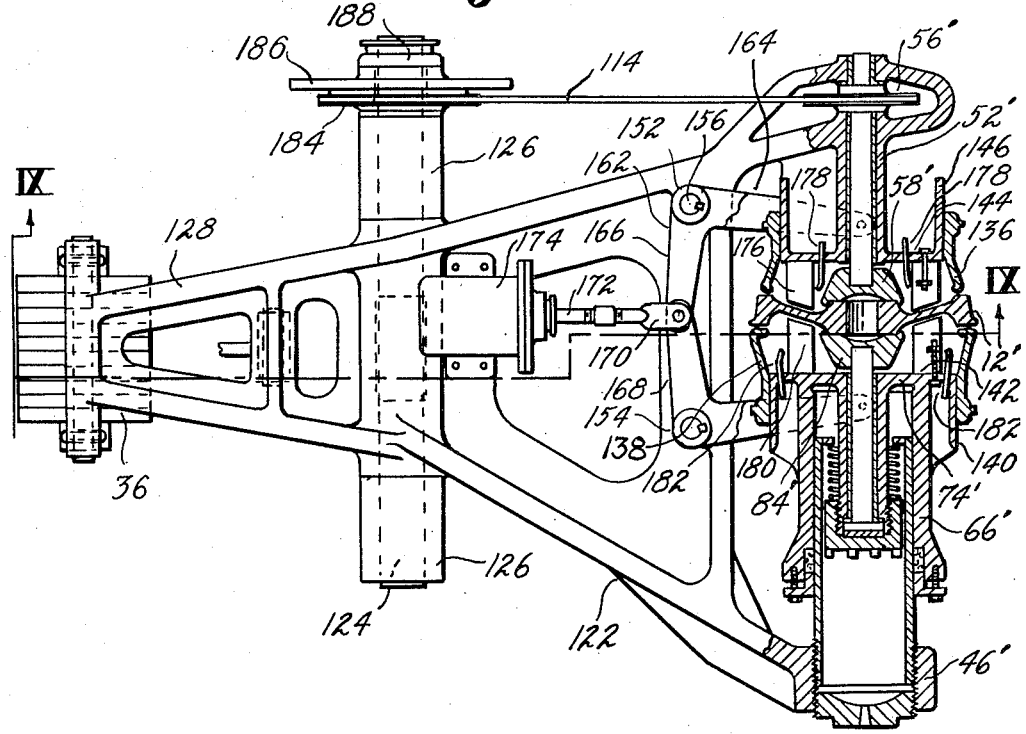
Figure 12:
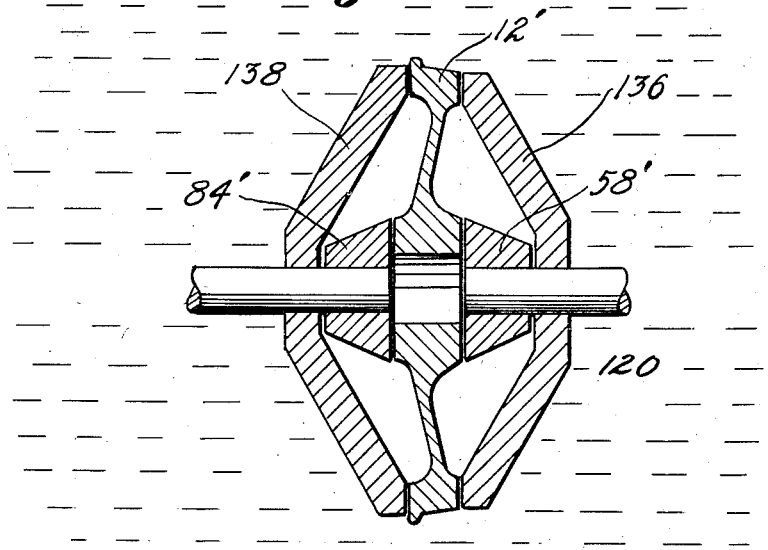
Figure 12:
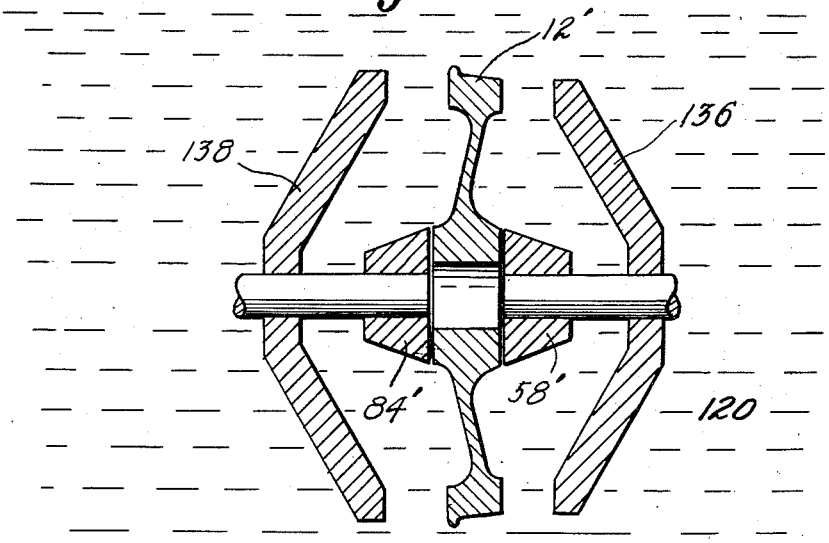

Figure 6ª is a diagrammatic view in vertical section illustrating the first part of an alternative method employing only water quenching;

Figure 6ᵇ is a view similar to that of Figure 6ª but showing the wheel in the second, plate quenching, position of such first alternative method;

Figure 7 is a view similar to Figure 6ᵇ but showing the wheel submerged to another alternative second, web plate quenching, position in the water bath;

Figure 8 is a diagrammatic view in vertical section through a wheel illustrating a still further alternative second, plate quenching, method employing water sprays;

Figure 9 is a view in vertical section through a modification of the wheel gripper and manipulator adapted for use with oil quenching alone of the wheel, the section being taken along the line IX—IX of Figure 11;

Figure 10 is a view in end elevation of the wheel and the gripper shown in Figure 9, the view being taken from the line X—X in Figure 9;

Figure 11 is a view in horizontal section through the gripper and manipulator of Figure 9, the section being taken along the line XI—XI of Figure 9;

Figure 12ª is a diagrammatic view in vertical section through the wheel showing the wheel in its first, rim quenching, position in the oil bath; and Figure 12ᵇ is a similar diagrammatic view showing such wheel in second, plate quenching, position in the oil bath.

In heat treating a wheel in accordance with the present invention the wheel is uniformly heated throughout its extent to a point above its transformation temperature, and is then removed from the furnace. In the preferred embodiment of the method, the wheel is first water quenched for a predetermined time on the rim while the plate and hub are shielded from contact with the quenching water spray or water bath, and additional heat is supplied, if necessary, to the plate to maintain it above the transformation point. The wheel is then transferred to an oil quenching bath in which it is submerged to quench the plate for a predetermined time, so that optimum properties are imparted to the rim and plate. The apparatus shown somewhat schematically in Figures 1 and 2 and in greater detail in Figures 3, 4, and 5 has proved eminently satisfactory for the carrying out of such preferred method.

Figure 1:
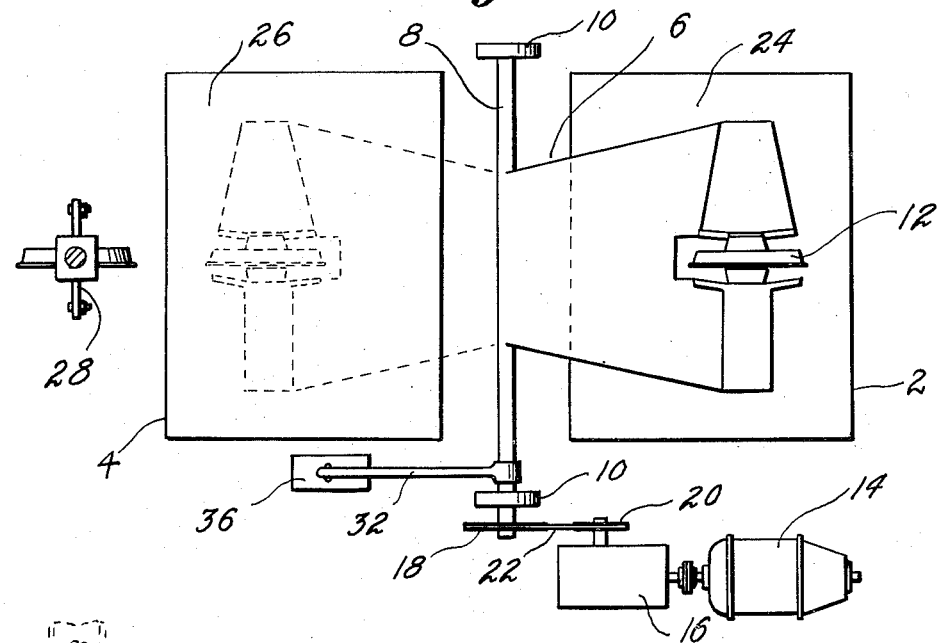
Figure 1 is a somewhat diagrammatic view in plan of the preferred embodiment of the apparatus employed in carrying out the preferred method of first water quenching the rim and then oil quenching the web plate and the rim.
Figure 2:
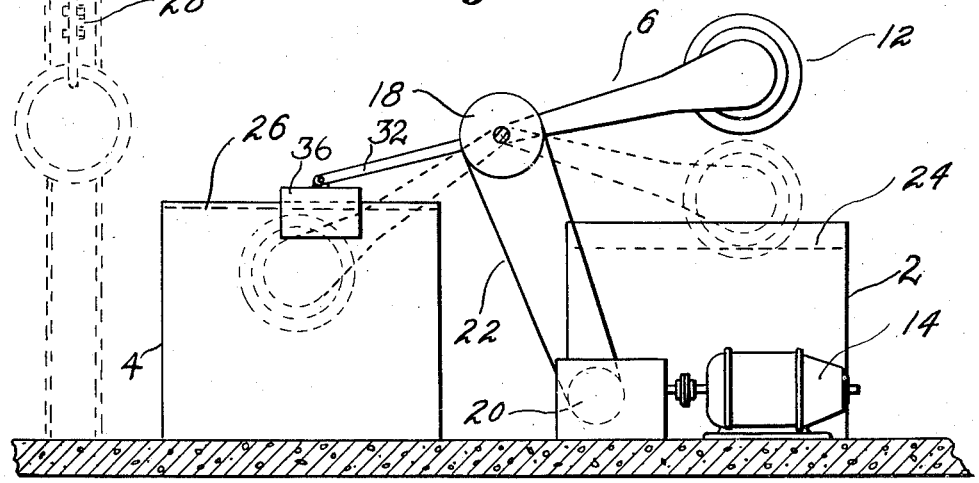
Figure 2 is a view in side elevation of the apparatus shown in Figure 1.

In Figures 1 and 2 there is shown a tank 2 containing a water bath 24 which is maintained at a predetermined level, as by means of a conventional overflow device (not shown). In line with tank 2 but spaced somewhat from it as shown, there is a further tank 4 containing an oil quenching bath 26. The wheel to be heat treated, which is designated 12, is mounted at the heat treating station in a wheel gripping and manipulating device, generally designated 6, consisting of an arm on the outer end of which is secured a gripping head, the inner end of the arm being mounted on horizontal shaft 8 between tanks 2 and 4 journaled in bearings 10, which are located beyond the tanks as shown in Figure 1. The device 6 is thus so mounted that its outer end, and consequently wheel 12 gripped thereby, may be positioned in any one of a variety of positions, from a location in which the wheel is fully submerged in the water bath to one in which it is fully submerged in the oil bath, by the turning of shaft 8 and consequently of the arm. Such turning of the arm may be accomplished by means of a motor 14 connected to a speed reducing gear box 16 which drives a sprocket 20. The shaft 8 is driven by sprocket 20 through a chain 22 traversing a sprocket 18 on the outer end of shaft 8. Motor 14, which is provided with conventional starting, stopping, and reversing controls as well as an electromagnetic brake, none of which is shown, may thus be made to swing the device 6 into any desired position, within the limits named, to permit loading of the device with the heated wheel 12 when it is raised to the position above tank 2, shown in Figure 2, to permit quenching of the rim or tread portion of the wheel when it is lowered toward the water bath, also as shown in Figure 2, and to permit further quenching of the rim and quenching of the plate when it is swung over to submerge the wheel in the oil bath 26. The degree to which the wheel may be submerged in the water bath may be accurately determined by providing suitable adjustable stop means (not shown) engaging the arm of device 6 to limit the degree of approach thereof toward the upper surface of the water bath, which, as above explained, is held at a constant level.

The gripper and manipulator device 6 is supplied with heated wheels and is unloaded after completion of the quenching operations on the wheel by means such as gripper 28, shown in Figures 1 and 2, which provides tongs for engaging the rim of the wheel to transfer it from the furnace to gripper 6, and from gripper 6 to a subsequent working station. The gripper may conveniently be mounted upon a conventional telpher crane.

Figure 5:
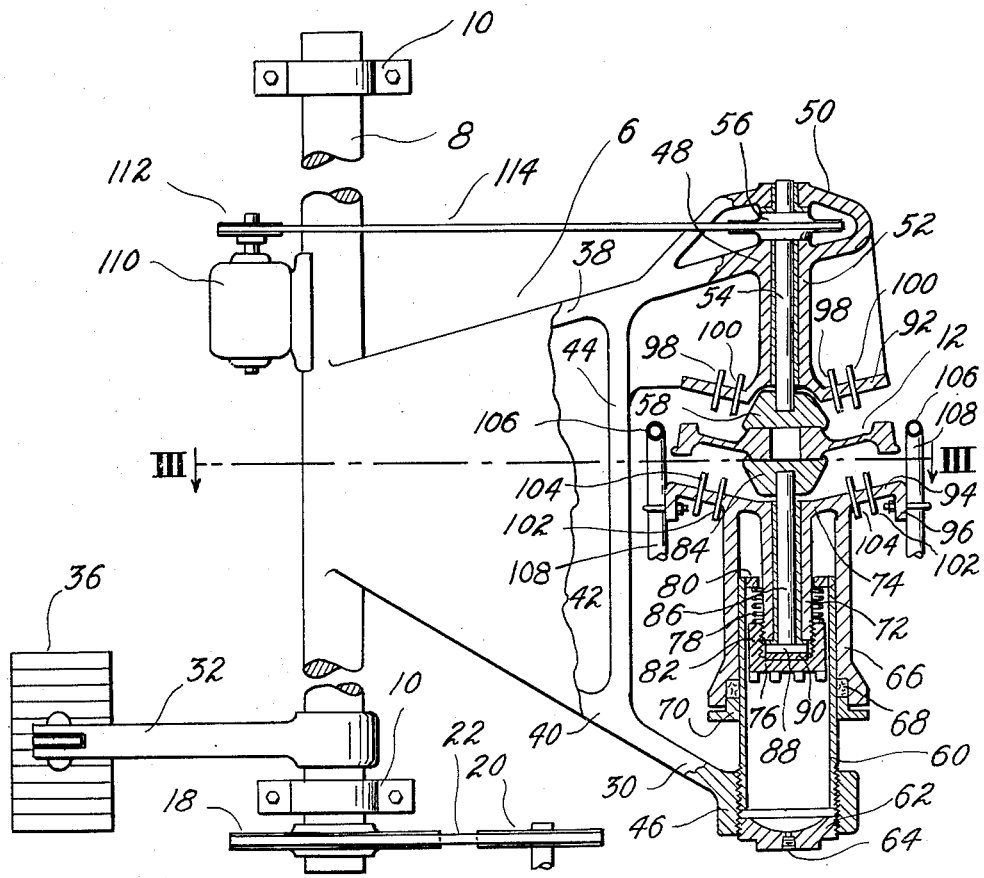
Figure 5 is a view in horizontal section through the device, the section being taken along the line V—V in Figure 3.

The gripper and manipulator device 6, as more fully shown in Figures 3, 4, and 5, comprises a supporting arm 30. Attached to shaft 8 at a position beyond the oil tank 4 is a rearwardly directed counterweight arm 32 having depending links 34 attached to the outer end thereof. To the bottom of links 34 are secured the separable counterweights 36. Counterweights may be added to or removed from the arm so that when a given size wheel 12 is treated, the structure as a whole is approximately balanced about the axis of shaft 8.

Arm 30 which may be of cast or welded construction, is generally of I-section, having a flange 38 on one side thereof and a flange 40 on the other, and being provided with a central longitudinal web 42. The arm is further strengthened by the provision of an upright transverse web 44 as shown. The arm flares laterally from the shaft so that its outer end forms a gripper head of generally yoke section, one leg of the yoke being enlarged at 46 to form a supporting hub whose axis is parallel to that of shaft 8. The other leg of the yoke is likewise enlarged to provide a housing 50 on the outside of flange 48, such leg also being provided with an inwardly directed sleeve 52 having a cylindrical bore therethrough coaxial with the hub of enlargement 46. Positioned in the bore through sleeve 52 is an axially fixed spindle 54 mounted for rotation therein, said spindle being driven by means of the sprocket 56 located in housing 50, the sprocket being keyed to the spindle. The inner end of spindle 54 may be squared or splined, if desired, to support and angularly position a cup-shaped gripper 58, the outer face of which is suitably recessed therefor. Gripper 58 has a forward wheel-engaging surface adapted to engage one side of the wheel 12 by contacting one side of the hub thereof.

The opening through hub 46 above described is threaded, as shown, to receive the outer threaded end of a fixed hollow cylinder 60, which constitutes the piston of a fluid operated reciprocating motor for advancing and retracting a movable wheel mounting cup-shaped gripper 84. Also screwed in the outer end of the bore in hub 46 is a plug 62 having a port 64 therein for the admission and exhaust of the fluid for operating the motor from a source not shown. Slidably mounted upon the outer surface of piston 60 is a movable cylinder 66, there being a packing 68 between the piston and cylinder, such packing being held in place by a gland 70. Cylinder 66 is provided at its inner end with a transverse wall 74 from which there projects outwardly a centrally located stem 72. A spindle 86 having the gripper 84 thereon is journaled in the stem. On the threaded outer end of the stem is affixed a cap 76 making a fluid tight connection therewith. By this construction, upon the admission of fluid under pressure through port 64 by means of a valve (not shown), cylinder 66 is moved inwardly to carry gripper 84 into wheel-engaging position. On release of the pressure on the fluid, the cylinder is retracted by a coil spring 78 surrounding the stem and compressed between a ring 80, welded to the inner end of piston 60, and the rim 82 of cap 76.

Spindle 86 is restrained from axial movement with respect to the cylinder by an enlarged head 88 on the outer end thereof disposed between the inner end of stem 72 and a thrust bearing 90 in cap 76. Thus, gripper 84 is supported in the cylinder 66 for idle rotation with a wheel gripped between it and gripper 58 by rotation of the spindle 54. This spindle is driven by motor 110 mounted upon shaft 8 through a sprocket 112 on the motor shaft, a sprocket 56 on the spindle and a connecting chain 114.

The stationary sleeve 52 is provided on its inner end with a shield 92, which is of approximately the same diameter as the wheel and lies substantially parallel to the web plate thereof. The inner wall 74 of cylinder 66 is likewise provided with a shield 94 of somewhat larger diameter than the wheel, and having upon its outer edge an outwardly directed flange 96 substantially coaxial with cylinder 66. Supported upon shield 92 are a plurality of burner nozzles 98 and a plurality of water spray nozzles 100, each set of nozzles being so arranged that the flames and water sprays therefrom, respectively, cover the entire area of the web plate of the wheel in a substantially uniform manner. Shield 94 is likewise provided with burner and spray nozzles 102 and 104, respectively, which are also located so that the flames and water sprays therefrom cover the entire area of the web plate. As will be clear hereinafter, the burner and spray nozzles are operated selectively and at different times. Supported upon the flange 96 are two arcuate conduits 106 provided with ports opening radially inward for quenching the rim of the wheel, each arcuate conduit being provided with two straight pipe sections 108 leading thereto bolted to the flange 96.

In Figure 4 there is shown the portion of the wheel gripping means in the vicinity of the wheel grippers 58 and 84 in the position they assume when the gripping means is open for the reception of a wheel to be heat treated. It will be apparent that the travel of cylinder 66 is such that retractable gripper 84, together with shield 94 and arcuate conduits 106, are retracted sufficiently so that the wheel may be introduced in a vertical straight line between the grippers by the telpher crane gripper.

A preferred method of quenching employing the apparatus shown in Figures 1 to 5, inclusive, is as follows:

The wheel is heated in a conventional furnace to a uniform overall temperature of between 1500 to 1650° F. It is then withdrawn from the furnace, turned to an upright position by conventional wheel handling apparatus, gripped by the telpher crane gripper 28, and transported to the wheel gripper and manipulator at the heat treating station. The wheel is then gripped as shown in Figure 5, wheel turning motor 110 is then started to rotate the wheel, the speed of rotation being, for instance, from 30 to 50 revolutions per minute. The wheel gripper and manipulator device is then lowered from the wheel loading position shown in Figure 2 to the quenching position shown in dotted lines at the right in that figure. In such quenching position a portion of the wheel rim dips into the water bath to effect quenching thereof. Preferably the rim is immersed in the bath to such a depth that from ¼ to ½ inch of the inner rim remains above the bath. The wheel is left in that position until at least ½ to ¾ of the rim has been transformed by quenching, which may take from 1 to 3 minutes, the web plate 17 of the wheel meanwhile being maintained above the transformation point, if necessary, by the application of heat thereto from burner nozzles 98 and 102 which immediately vaporize any water which may fall upon the web plate during quenching of the rim. Rotation of the wheel likewise aids in removing water from the plate. The severity of quenching of the rim and particularly of the tread is increased by the application of tread quenching sprays to tread 15 of the wheel by means of the arcuate spray pipes 106. When the rim has been sufficiently transformed, the heating flames from nozzles 98 and 102 are shut off, and the gripper is then rotated about shaft 8 by actuation of motor 14 to withdraw the wheel from the water bath and to completely immerse it in the oil bath 26, as shown in dotted lines at the left in Figure 2, where it may be left until the plate is completely transformed, which may take from 1 to 4 minutes, depending upon the thickness of the plate, wheel section, and the character of the final structure desired in the plate. During such second web plate quenching operation, the wheel may or may not be rotated, as desired, by operation of motor 110. It is preferred that it be rotated, however, to agitate the bath and to secure greater speed and uniformity of quenching. After being thus quenched in the oil bath, the wheel is withdrawn, removed from the gripper, and is drawn at temperatures of from 700 to 980° F., after which it is slowly cooled.

As a result of such treatment, it will be found that tread 15 of the wheel, indicated in Figure 4, which has been most drastically quenched, is very hard, that the remainder of rim 13 is tough and shock resistant, that web plate 17, having been less drastically quenched in the oil bath, is resilient and resistant to fatigue, and that hub 19, especially in the portion abutting the bore 21 therethrough, remains in a relatively soft machinable condition due to its having been covered on its inner portions by grippers 58 and 84. The residual stresses produced in wheels so treated closely approach those of the desirable residual stresses found in rim toughened wheels. A wheel so treated therefore combines the advantages of the resistance to thermal cracking and plate failure caused by brake application, characteristic of the rim toughened wheel and the fatigue resistance to plate failure of the oil quenched wheel.

The above preferred method of heat treating the wheels is capable of considerable variation. Thus, in some instances, it is desired to dispense with the oil quench of the plate and to water quench both the rim and the plate. In this case, the oil bath will be omitted and only a water bath, such as bath 116 shown in Figures 6a and 6b, need be provided. In such variation of the method, the gripper device indicated generally by the reference character 6 may be loaded as before in the loading position A, and may then be lowered into the position B, wherein a portion of the rim is immersed in the water bath. If desired, the plate may, as before, be heated as by the burners 98 and 102 when the wheel is in position B. After a predetermined period of quenching the rim, which may take from 1 to 3 minutes in order to transform from ½ to ¾ of the rim, gripper 6 is lowered to bring the wheel into the position C, shown in Figure 6b, so that the entire wheel with the exception of that portion of the hub blanketed by grippers 58 and 84 may be drastically quenched.

The method may further be varied, if desired, by the modification of the second, plate quenching, step of the method depicted in Figures 6a and 6b in the manner illustrated in Figure 7. As there shown, the wheel, in the second, plate quenching, step, is lowered into the water bath 116 to a depth such that the bottom portion of the plate of the wheel is substantially wholly immersed in the bath, but the hub and the hub engaging members of the gripping and manipulating device remain above the bath. By the use of the last described second quenching step, the hub and portion of the plate immediately adjacent it are slightly softer than they are when the wheel is completely immersed, because they are somewhat less drastically cooled.

The method may be additionally varied, when using the water spray quenching alone, by substituting the operation depicted in Figure 8 for that shown in Figure 6b. In this case, instead of being immersed completely in the water bath, the wheel remains in the position B, shown in Figure 6a, but the heating flames directed upon the plate are cut off and water sprays from nozzles 100 and 104 are played upon the plate, as shown in Figure 8. In this modification the tread quenching sprays from annular pipes 106 may be used in both the first rim quenching step and also the plate quenching step, or the tread quenching nozzles may be shut off when performing the second, plate quenching operation, shown in Figure 8, if desired.

In some cases it is desired to employ heat treatments of railway wheels involving quenching of the rim and plate in oil baths alone. For this type of treatment, the apparatus shown in Figures 9, 10, and 11 has proved very satisfactory. The parts thereof which are similar to those in the structure shown in Figures 1 to 5, inclusive, are similarly designated but with primed characters. In this modification, a tank 118 containing an oil bath 120 is employed, over which the wheel gripper and manipulator is pivoted on the transverse shaft 124, to allow movement of the wheel gripped thereby from a position above the bath, for loading and unloading of the fixture, to a position in which the wheel is fully immersed in the bath. Due to the fact that but one quenching tank is employed, trunnions 126 carrying the shaft 124 may be located close to the arm 122 of the gripper, and the counterweight arm 128 may be positioned generally as an extension of arm 122. Depending from the rear end of the counterweight arm are links 34' to which are attached the separable counterweights 36'. The apparatus for tilting arm 122 of the gripper in this instance consists of a crank 130 driven by a motor through a suitable reduction gear (not shown), so that the crank can be turned to and stopped at various angular positions. Crank 130 is connected to the counterweight arm 128 by a pitman 132 connected to the arm by pivot pin 134.

In this modification the means for supporting wheel 12', for rotating it, and for advancing and retracting the movable gripper means 84' are the same as those in the first modification, and need not be particularly described. The present apparatus differs from that of the first modification primarily in the provision of rotatable cuplike wheel rim engaging shields 136 and 138, which are advanced against the wheel to shield the web plate during the rim quenching operation, and are retracted therefrom to expose the web plate to the quenching action of the oil bath in the second step of the operation. The retractable shield 138 is positioned for rotation and axial sliding movement upon the outer cylindrical bearing member 140 which is attached to the front wall 74' of the cylinder 66' and extends outwardly, as shown. Shield 136 is supported for rotation and axial movement upon the similar cylindrical bearing member 146 attached to the radially directed flange 144 on the forward end of sleeve 52'. Shields 136 and 138 are frictionally driven by wheel 12' when in engagement therewith.

The shields are moved axially to advance them toward the wheel and retract them therefrom by means of the annular ribs 148 and 150, extending radially from, such ribs being engaged by shield shifting mechanism constructed as follows: Arm 122 is provided with two vertically extending elongated bosses 152 and 154 through the bores in which extend vertical shafts 156. Each shaft has keyed to the bottom thereof a shield shifting lever 158, shown in Figure 9, and each lever carries on its outer end a pivotally mounted shoe having a groove therein fitting over the corresponding annular rib on the shield. Bell cranks 162 and 168 are secured to the upper ends of shafts 156, respectively. Each bell crank has an arm such as 164 extending toward the shield, such arm carrying on its outer end a pivotally mounted shoe engaging the annular rib of the shield. Each bell crank is also provided with an arm 166 extending generally axially of the wheel gripping means. The inner ends of both arms have elongated slots engaged by a common pin extending through the clevis 170. The clevis in turn is attached to the outer end of piston rod 172 of the double acting fluid actuated motor 174. The arrangement is such that upon actuation of the motor 174 to thrust piston rod 172 outwardly thereof, shields 136 and 138 are retracted from the wheel, whereas upon travel of piston rod 172 inwardly of the motor, the shields are brought into engagement with the rim of the wheel.

In order to insure the retention of the web plate of the wheel at a temperature above the transformation point during the quenching of the rim, there are provided heating means interiorly of the space provided by the retractable shields and the wheel gripping means. In the modification shown, the heating means takes the form of high frequency induction coil heaters 176 and 180, coil 176 being affixed to the inner surface of flange 144 and coil 180 being attached to the inner surface 142 of the forward wall 74' of cylinder 66'. Such coils, which are conventional in design, may be supplied with current through leads, such as 178 for coil 176 and 182 for coil 180.

Rotation of the wheel when engaged by the gripper and manipulator is effected in this instance by means of sprocket 184 idly mounted upon the end of shaft 124 and connected to sprocket 56' by means of chain 114'. Sprocket 184 is in turn driven by means of sprocket 186, likewise idly mounted upon shaft 124, the two sprockets being secured together as shown, and being retained upon the shaft by means 188. Sprocket 186 is rotated by means of a suitably geared motor (not shown) attached to a convenient part of the rigid foundation.

The operation of the apparatus shown in Figures 9, 10, and 11 in carrying out a preferred method employing oil quenching alone is depicted in Figures 12ª and 12ᵇ. As shown in the first of these figures, the wheel 12', which is at a temperature above its transformation temperature, when engaged in the gripper and with the shields 136 and 138 held tightly thereagainst is set into rotation and is completely immersed in the oil bath. Ordinarily the heating coils 176 and 180 are operated to maintain the web plate at a temperature above its transformation point during the rim quenching operation, but in some instances this may be dispensed with. Thereupon the rim of the wheel, since it is directly in contact with the oil, is progressively quenched. It has been found that oil seepage between the wheel and the shields is negligible if an appreciable pressure between shields and wheel is employed. In any event, oil seeping into the closed space is quickly vaporized because of the high temperature of the plate, thereby creating a positive pressure within the closed space which effectively prevents further oil seepage.

The apparatus is maintained in the condition shown in Figure 12ª, preferably for a time suitable to allow transformation of from ½ to ¾ of the wheel rim. Thereupon the plate heating coils are shut off, and the shields 136 and 138 are retracted to allow the quenching oil bath to contact the entire wheel with the exception of the hub portion blanketed by the gripping means. The wheel may be rotated, in such second quenching operation, if desired, but this is not necessary. Rotation of the wheel during such operation is to be preferred, however, to agitate the bath and to secure greater speed and uniformity of quenching. The wheel is allowed to remain in the bath, as shown in Figure 12ᵇ, for a period suitable to accomplish complete transformation of the plate and the outer portion of the hub. Thereupon the wheel is removed from the bath and is drawn by being heated and cooled in the manner above disclosed in connection with the combined water and oil quench.

Having thus fully described preferred embodiments of my improved method for heat treating wheels, I desire to claim as new the following.

I claim:

1. The method of heat-treating steel railway wheels which comprises heating a wheel throughout to a temperature above its transformation point, seizing the wheel hub between opposed, horizontally aligned gripping heads, manipulating said heads to lower the rim of the wheel only into a quenching liquid and rotating the wheel while maintaining the hub and web plate of the wheel above said transformation point, and then quenching the entire web plate and rim of the wheel substantially simultaneously by contact with a quenching medium while maintaining engagement of said heads with the hub, thereby shielding the hub at least in a substantial zone adjacent the axis thereof from contact with the quenching medium.

2. The method of heat-treating steel railway wheels which comprises heating a wheel throughout to a temperature above its transformation point, seizing the wheel hub between opposed, horizontally aligned gripping heads, applying substantially cup-like protective shields to both sides of the wheel rim, manipulating the heads to immerse the wheel in a quenching bath and rotating the wheel while maintaining the shields in engagement with the rim to prevent contact of the bath with the hub and web plate of the wheel, then retracting the shields from the wheel to admit the fluid of said bath into contact with the web plate thereby quenching it, and maintaining engagement of said heads with the hub, thereby shielding the hub at least in a substantial zone adjacent the axis thereof from contact with the quenching medium.

3. The method defined by claim 1 characterized by effecting said web-plate quenching by manipulating the heads further to lower the wheel into a liquid bath to a depth sufficient to cover at least a substantial portion of the web plate.

HAROLD B. WISHART.

REFERENCES CITED

The following references are of record in the file of this patent:

UNITED STATES PATENTS

| Number | Name | Date |
| --- | --- | --- |
| 1,704,327 | Kenney et al. | Mar. 5, 1929 |
| 1,740,347 | Hildorf | Dec. 17, 1929 |
| 1,859,623 | Gregg | May 24, 1932 |
| 2,146,516 | Stephenson | Feb. 7, 1939 |
| 2,146,793 | Buckner | Feb. 14, 1939 |
| 2,178,281 | Judge | Oct. 31, 1939 |

FOREIGN PATENTS

| Number | Country | Date |
| --- | --- | --- |
| 240,882 | Great Britain | Oct. 12, 1925 |